(No Model.) 2 Sheets—Sheet 1.

F. CHALLONER.
SHINGLE SAWING MACHINE.

No. 593,983. Patented Nov. 23, 1897.

Witnesses: Inventor
Geo. W. Young. Frank Challoner.
Chas. L. Goss. By Winkler, Flanders, Smith, Bottum & Vilas.
Attorneys

THE NORRIS PETERS CO., PHOTO-LITHO., WASHINGTON, D. C.

(No Model.) 2 Sheets—Sheet 2.
F. CHALLONER.
SHINGLE SAWING MACHINE.
No. 593,983. Patented Nov. 23, 1897.
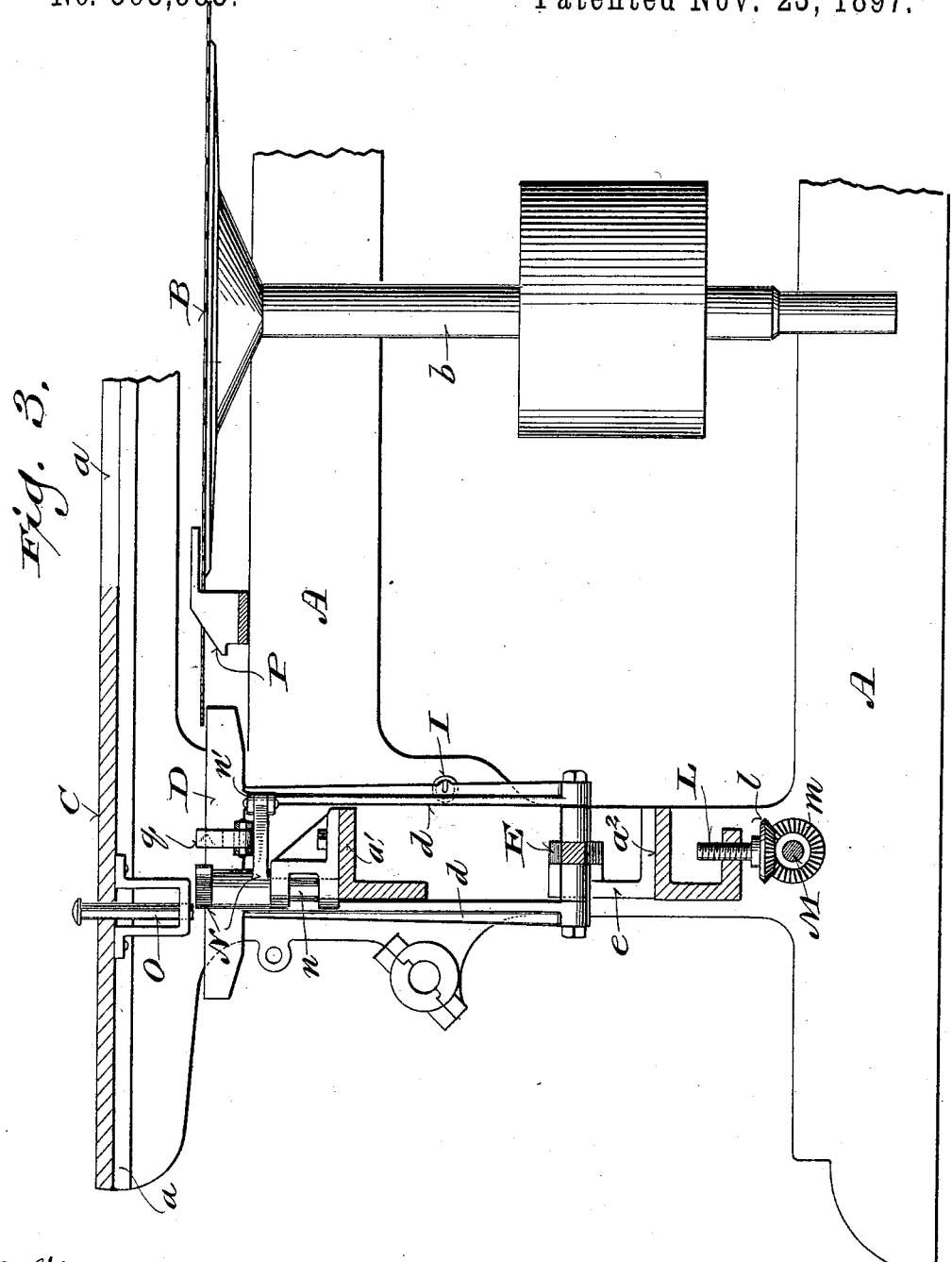
Witnesses:
Geo. W. Young,
Chas. L. Goss.
Inventor:
Frank Challoner,
By Winkler Flanders Smith Bottum & Vilas
Attorneys.

UNITED STATES PATENT OFFICE.

FRANK CHALLONER, OF OSHKOSH, WISCONSIN.

SHINGLE-SAWING MACHINE.

SPECIFICATION forming part of Letters Patent No. 593,983, dated November 23, 1897.

Application filed September 10, 1896. Serial No. 605,350. (No model.)

*To all whom it may concern:*

Be it known that I, FRANK CHALLONER, of Oshkosh, in the county of Winnebago and State of Wisconsin, have invented certain new and useful Improvements in Shingle-Sawing Machines; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to that class of shingle-sawing machines in which a reciprocating carriage is employed to carry the blocks to be sawed back and forth over the saw and a tilting support upon which they are dropped after each cut is made and by which they are tipped slightly in opposite directions, so as to cause the saw to cut the butts and points alternately from opposite ends of the block and thereby sever the shingles therefrom approximately parallel with the grain of the wood.

Its main object is to facilitate the removal from the machine of the spalt or residuum of the blocks from which shingles have been sawed, and generally to simplify and improve the construction and operation of machines of this class.

In the accompanying drawings like letters designate the same parts in the several figures.

Figure 1:
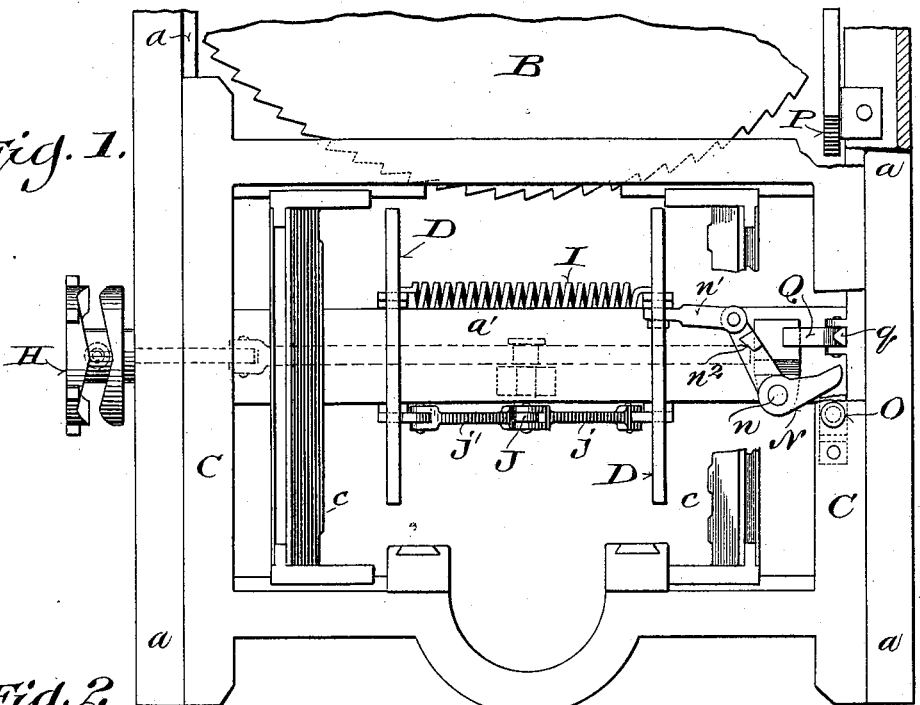
Figure 2:
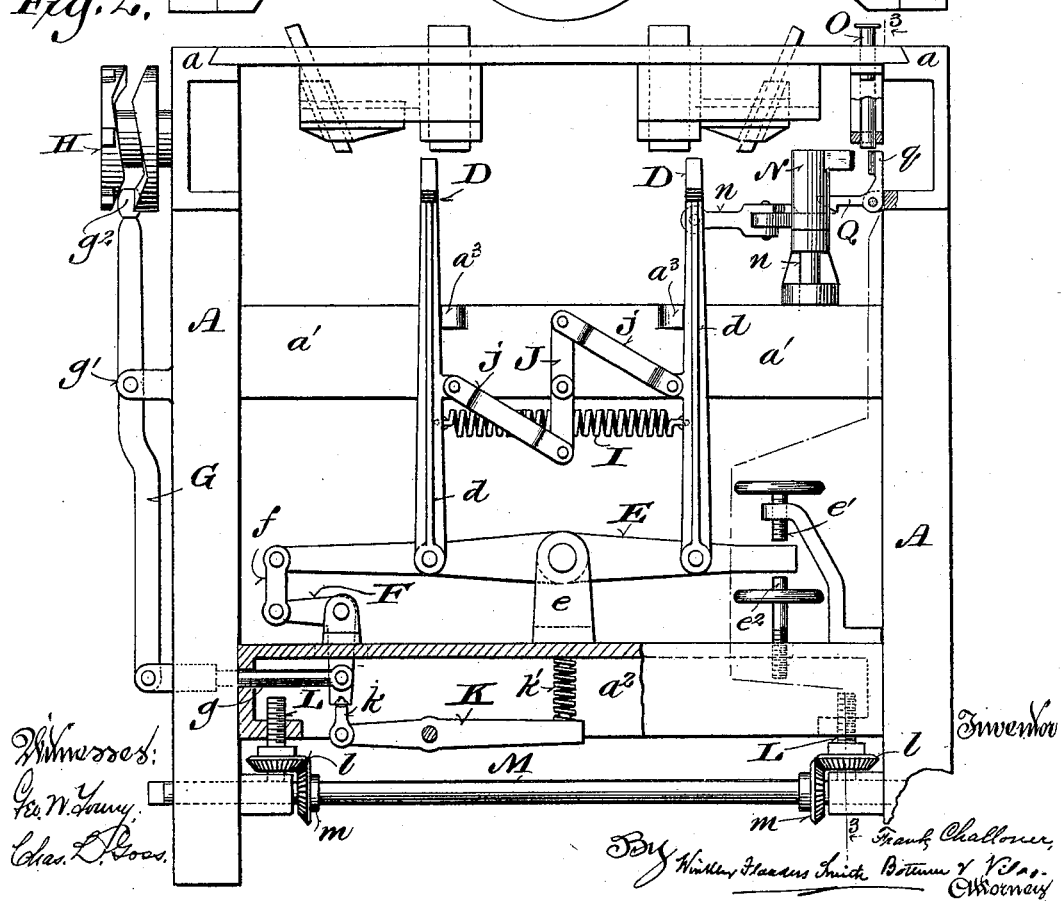

Figure 1 is a plan view of a shingle-sawing machine embodying my improvements. Fig. 2 is a front elevation of the same; and Fig. 3 is a vertical longitudinal section on the line 3 3, Fig. 2.

A designates the frame of the machine, B the saw, carried in a horizontal position on the upper end of a vertical arbor $b$, and C a reciprocating carriage movable on ways $a$ $a$ back and forth over the saw and provided with dogs $c$ $c$. The foregoing parts are or may be similar to those commonly employed in machines of this class.

My improvements are applicable to machines employing two carriages arranged on opposite sides of the saw, as well as to machines having one carriage; but the mechanism embodying my improvements for a two-block machine being merely duplicated it will be sufficient to describe it in connection with one carriage only.

D D are two horizontally-disposed block-supports extending normally slightly below the plane of the saw and parallel with the carriage-ways at such a distance apart as to support a shingle-block dropped thereon from the carriage near its ends. They are carried upon the upper ends of upright arms $d$ $d$, which are pivoted at their lower ends to a horizontal lever E, and pass upwardly therefrom on opposite sides of a cross-piece $a'$ of the frame. The lever E is fulcrumed midway between the pivot connections therewith of each pair of arms $d$ $d$ to a bracket $e$, rising from a cross-piece $a^2$ of the frame. It projects at one end between two screws or adjustable stops $e'$ and $e^2$, which are threaded one in the cross-piece $a^2$ and the other in line therewith in a bracket rising from said cross-piece. At its opposite end the lever E is connected by a link $f$ with the horizontal arm of a bell-crank lever F, which is fulcrumed at its elbow in a bracket on the cross-piece $a^2$. The vertically-disposed dependent arm of the lever F is connected by a rod $g$, adjustable in length with the lower end of an upright lever G, which is fulcrumed at $g'$ to the side of the frame and is provided at its upper end with a friction-roller $g^2$, projecting into a zigzag groove in the periphery of the cam-wheel H. This wheel is provided on its periphery with teeth corresponding in number and arrangement with the turns in the cam-groove and adapted to be engaged by a pawl (not shown) pivoted to the carriage during each advance movement of the carriage. This cam and ratchet wheel and its actuating-pawl are in construction and operation substantially like those heretofore employed in machines of this class and need not be more specifically described. The upright arms $d$ $d$ on one side of the cross-piece $a'$ are connected by a spring I, which tends to draw them together and holds them or the arms on the opposite side of the cross-piece normally against the stops $a^3$ $a^3$ on said cross-piece, as shown in Fig. 2. The arms $d$ $d$ on the front side of the cross-piece are connected by links $j$ $j$ with a vertically-disposed lever J, which is fulcrumed midway between said links to said cross-piece.

K is a horizontally-disposed lever fulcrumed to the lower part of the cross-piece $a^2$ and provided at one end with a pointed bearing $k$, pivoted thereto and engaging a tapering cavity in the lower end of the lever F. A spring $k'$, interposed between the opposite end of lever K and the cross-piece $a^2$, presses the bearing $k$ constantly upward against the lever F, yieldingly holding it in either of its extreme positions into which it is alternately shifted by the cam-wheel H and its connections. The rocking movement of the lever E, and consequently the vertical movement of the block-supports D D, is limited by the stops $e'$ and $e^2$. The friction-roller $g^2$ has sufficient play in the groove of cam H to allow the lever E to be thrown by the spring $k'$ in either direction against one or the other of the stops $e'$ and $e^2$ when the depending arm of lever F is carried past a vertical line, the cam-groove being constructed to swing said arm in both directions a little beyond a vertical line passing through the pivot of the bearing $k$.

L L are vertical screws threaded in the lower side of the cross-piece $a^2$ near its ends and supported at their lower ends in step-bearings formed with or attached to the sides of the frame A, as shown in Figs. 2 and 3. They are provided with bevel-gears $l\ l$, which mesh with similar gears $m\ m$ on a horizontal shaft M, which extends across the machine and is supported at the ends in bearings in the frame. At one end the shaft M projects outside of the frame and is squared, as shown in Fig. 2, or provided with other means of turning it for the purpose of raising or lowering the cross-piece $a^2$ and the tilting and spalt-dropping mechanism carried thereby.

N is a bell-crank lever fulcrumed at its elbow on a vertical pin or stud $n$, rising from the cross-piece $a'$. It is connected at one end by a link $n'$ with the adjacent block-support D and projects at its opposite end into the path of a vertically-movable pin or trip O, carried by the carriage when said pin or trip is depressed or lowered into abnormal position.

P is an incline attached to the frame of the machine in the path of the pin or trip O and constructed and arranged to automatically return it to its normal position as the carriage advances over the saw.

Q is a gravitating hook pivoted to the side of the frame and arranged to engage with a projection $n^2$ on the upper side of the lever N when it is turned outwardly and to hold it in that position and the block-supports D D spread apart until said hook is released, as hereinafter explained. The hook Q is formed with an upwardly-projecting arm $q$, which has an incline in the path of the trip-pin O when the latter is depressed into abnormal position.

My improved machine operates as follows: A shingle-block being placed in the carriage on the supports D D is held thereby on the under side in the proper position with relation to the saw to cause the saw to cut a shingle of the required shape and thickness from the under side of the block when it is dogged in that position in and carried forward by the carriage. At each advance movement of the carriage the cam-wheel is turned an interval, which tilts the lever G first to one side and then to the other, and through the connections hereinbefore described tilts the lever E, alternately raising and lowering one of the block-supports D and simultaneously lowering and raising the other support, whereby the shingle-block which is dropped thereon at each return movement of the carriage is tipped first to one side and then to the other, so as to cause the saw to cut the butts and points of shingles alternately from opposite ends of the block. When as many shingles as practicable have been cut from a block and it is desired to remove the spalt or residuum from the machine, the operator depresses the pin or trip O while it is passing in the return movement of the carriage between the incline P and lever N. As the carriage is brought over the tilting mechanism and the block is released by the dogs and dropped the lower end of said pin engages with the outwardly-projecting arm of the lever N and turns the other arm outwardly, thereby spreading or swinging both block-supports D D outwardly and allowing the block to fall between them. The lever J and its link connections with the arms $d\ d$ of the block-supports causes the outward or inward movement of either of said supports to produce a like and simultaneous movement of the other. The hook Q, catching over the lug $n^2$ of lever N when it is turned outwardly, holds the block-supports spread for a sufficient length of time to allow the block dropped from the carriage to pass between them; but when the carriage advances a short distance the trip-pin, engaging with the incline on the arm $q$ of said hook, disengages it from the lever N, whereupon the spring I will instantly swing the arms $d\ d$ inwardly against the stops $a^3\ a^3$ and return the block-supports D D to their normal positions to receive another block before it is dogged in the carriage. During the next advance movement of the carriage the trip-pin is engaged and restored to normal position by the incline P, and it is held in that position out of range with lever N by frictional or other resistance to its movement until it is again depressed by the operator.

The taper of the shingles may be varied as desired by the adjustment of the stops $e'$ and $e^2$, by which the vertical movement of the block-supports D D is limited. The thickness of the shingles, irrespective of their taper, is varied by the vertical adjustment of the cross-piece $a^2$, which is effected by turning the shaft M.

The details of the machine herein shown and described may be variously modified within the spirit and intended scope of my invention.

I claim—

1. In a shingle-sawing machine the combination with the saw and a reciprocating carriage of block-tilting mechanism comprising two vertically and laterally movable supports over which the carriage passes in its return movement from the saw, mechanism for alternately moving said supports vertically, one up and the other down, and mechanism under the control of the operator for moving said supports laterally away from each other whereby a block or spalt is permitted to fall between them, substantially as and for the purposes set forth.

2. In a shingle-sawing machine the combination with the saw and carriage of block-tilting mechanism consisting of two vertically and laterally movable supports, a horizontally-disposed rocking lever pivotally connected on opposite sides of its fulcrum with said supports, mechanism for tilting said lever alternately in opposite directions each time the carriage passes over said supports, a lever connected with and arranged to move said supports apart so as to allow a block or spalt to fall between them, and a trip on the carriage movable by the operator into range with one arm of said lever and adapted in abnormal position to swing said supports away from each other on their pivot connections with said rocking lever, substantially as and for the purposes set forth.

3. In a shingle-sawing machine the combination with the saw and carriage of block-tilting and spalt-dropping mechanism consisting of two horizontal supports below the path of the carriage, a horizontally-disposed rocking lever with which said supports are pivotally connected, a spring tending to draw said supports toward each other and holding them normally in operative position, a lever fulcrumed to the frame and connected on opposite sides of its fulcrum by links with said supports, whereby a lateral movement of one support causes a like movement of the other, a lever fulcrumed to the frame of the machine and connected with one of said supports, and a trip on the carriage movable by the operator into range with a part of said lever and adapted by engagement therewith to spread said supports sufficiently to allow a spalt or block to fall between them, substantially as and for the purposes set forth.

4. In a shingle-sawing machine the combination with the saw and carriage of block-tilting mechanism consisting of two vertically-movable supports, a horizontally-disposed rocking lever pivotally connected with said supports on opposite sides of its fulcrum, a bell-crank lever having a dependent arm and a horizontally-disposed arm connected by a link with said rocking lever, a horizontally-disposed lever constantly pressed downward at one end and having an upwardly-bearing connection at the opposite end with the dependent arm of said bell-crank lever, an intermittingly-turning cam-wheel and a vertically-disposed lever engaging at its upper end with said cam-wheel and connected at its lower end with the dependent arm of said bell-crank lever, substantially as and for the purposes set forth.

5. In a shingle-sawing machine the combination with the saw and carriage of block-tilting mechanism consisting of two vertically-movable supports, a horizontally-disposed rocking lever pivotally connected on opposite sides of its fulcrum with said supports, means for automatically tilting said lever alternately in opposite directions and a vertically-adjustable support to which said rocking lever is fulcrumed, substantially as and for the purposes set forth.

6. In a shingle-sawing machine the combination with the saw and carriage of block-tilting mechanism consisting of two vertically-movable supports, a horizontally-disposed rocking lever pivotally connected with said supports on opposite sides of its fulcrum, a bell-crank lever having a dependent arm and a horizontally-disposed arm connected with said rocking lever, a horizontally-disposed lever forced downward on one side of its fulcrum with a yielding pressure, and bearing upward on the opposite side of its fulcrum against the dependent arm of said bell-crank lever, means of alternately swinging the dependent arm of said bell-crank lever past a vertical line and adjustable stops for limiting the vertical movement of said rocking lever, substantially as and for the purposes set forth.

7. In a shingle-sawing machine the combination with the saw and carriage of block-tilting mechanism consisting of two vertically-movable supports, a horizontally-disposed rocking lever pivotally connected on opposite sides of its fulcrum with said supports, a bell-crank lever having a horizontally-disposed arm connected by a link with one arm of said rocking lever, a horizontally-disposed lever constantly pressed downward at one end by a spring and having an upwardly-bearing connection at the opposite end with the dependent arm of said bell-crank lever, and a vertically-adjustable support to which said several levers are fulcrumed, substantially as and for the purposes set forth.

8. In a shingle-sawing machine the combination with the saw and carriage of block-tilting mechanism consisting of two vertically-movable supports, a horizontally-disposed rocking lever pivotally connected on opposite sides of its fulcrum with said supports, a vertically-adjustable support to which said lever is fulcrumed, vertical screws having threaded connections with said support and bearings at their lower ends on the frame, and a horizontal shaft connected by bevel-gears with said screws for adjusting said support, substantially as and for the purposes set forth.

9. In a shingle-sawing machine the combination with the saw and carriage of two vertically and laterally movable block-supports, a lever connected with and arranged to spread said supports sufficiently to allow a block to fall between them, a trip on the carriage movable by the operator into position to engage said lever, and an incline on the frame of the machine arranged to return said trip automatically to normal position, substantially as and for the purposes set forth.

10. In a shingle-sawing machine the combination with the saw and a reciprocating carriage arranged to travel back and forth over the saw, of two laterally and vertically movable block-supports, means of alternately raising and lowering said supports, a lever connected with and arranged to spread said supports sufficiently to allow a shingle-block to fall between them, a trip on the carriage movable by the operator into position to engage said lever, and a gravitating catch arranged to engage said lever and hold it in abnormal position, and provided with an incline in the path of said trip when the latter is in abnormal position for disengaging said catch and releasing said lever, substantially as and for the purposes set forth.

In testimony that I claim the foregoing as my own I affix my signature in presence of two witnesses.

FRANK CHALLONER.

Witnesses:
J. H. DAVIDSON,
M. C. PHILLIPS.